United States Patent [19]
Gandon et al.

[11] 3,903,246
[45] Sept. 2, 1975

[54] REMOVAL OF COBALT FROM NICKEL SALT SOLUTIONS

[75] Inventors: Louis Gandon; Christian Bozec; Philippe Lenoble, all of Le Havre, France

[73] Assignee: "Le Nickel", Paris, France

[22] Filed: Aug. 31, 1973

[21] Appl. No.: 393,286

Related U.S. Application Data

[62] Division of Ser. No. 290,377, Sept. 19, 1972, which is a division of Ser. No. 62,579, Aug. 10, 1970, abandoned.

[30] Foreign Application Priority Data

Aug. 12, 1969 France .............................. 69.27704

[52] U.S. Cl. ................. 423/144; 210/50; 423/419; 423/87; 423/92; 252/186
[51] Int. Cl. ............................................ C01g 51/06
[58] Field of Search ....... 423/140, 144, 419; 210/50

[56] References Cited
UNITED STATES PATENTS

| | | |
|---|---|---|
| 2,377,832 | 6/1945 | Wallis et al. .......................... 423/140 |
| 2,726,144 | 12/1955 | Wallis et al. .......................... 423/140 |
| 2,842,427 | 7/1958 | Reynaud et al. ..................... 423/140 |
| 2,864,692 | 12/1958 | Manche et al. ...................... 423/140 |
| 2,971,836 | 2/1961 | Hall .................................... 423/140 |

OTHER PUBLICATIONS

Gmelins Handbuch Der Anorganischen Chemie, System Numner 57, Tiel B–Lieferung 3, 1966, pp. 846–849.

Primary Examiner—Herbert T. Carter
Attorney, Agent, or Firm—Maky, Renner & Jeffery

[57] ABSTRACT

A compound for use as an oxidizing agent in an aqueous saline reaction medium, having a base of nickel salts which is a basic nickel III carbonate of the general formula:

$$Ni_2(CO_3)_3, y\ Ni_2O_3, z\ H_2O$$

in which $y$ is between 3 and 10 and $z$ is between 4 and 10.

6 Claims, 1 Drawing Figure

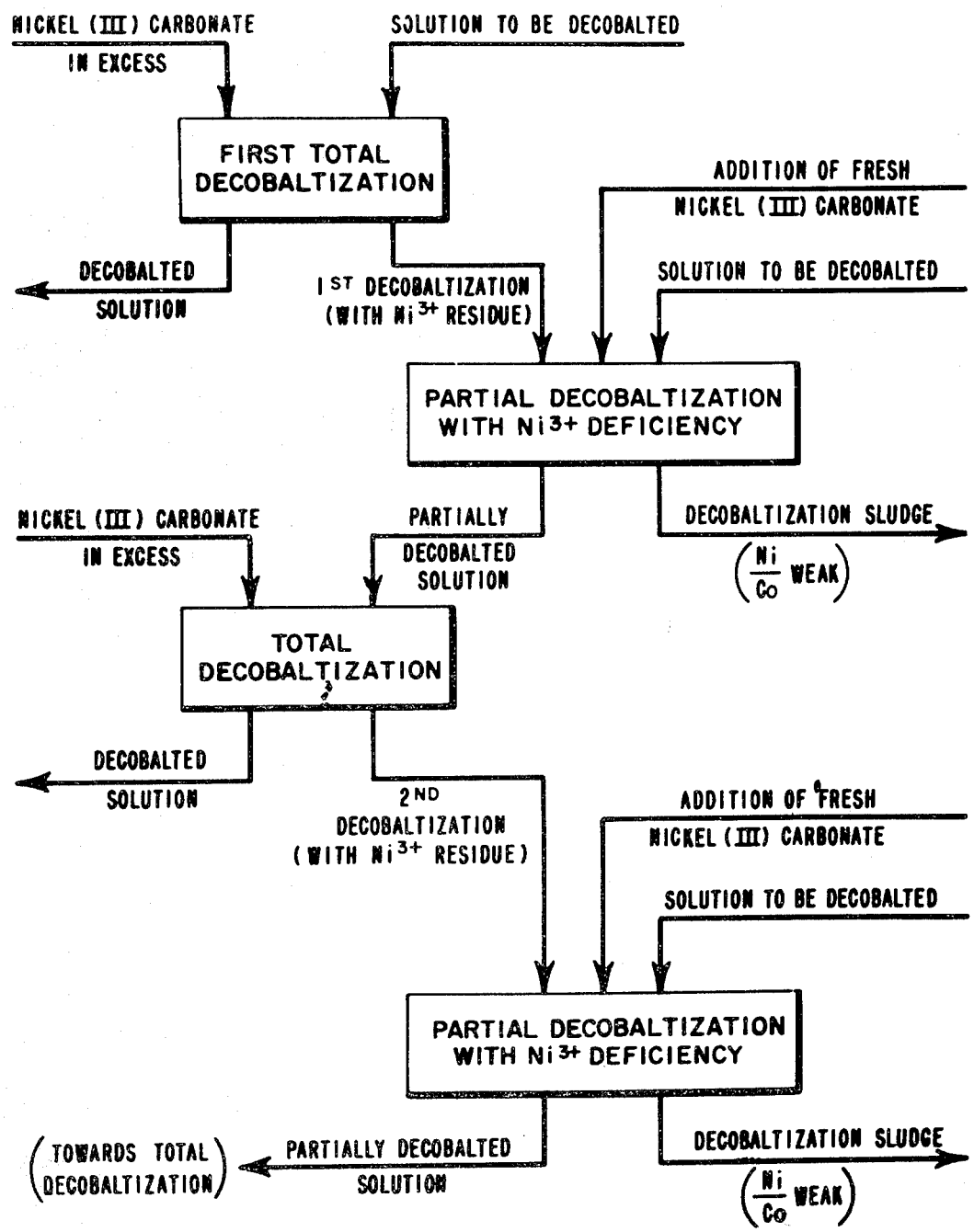

REMOVAL OF COBALT FROM NICKEL SALT SOLUTIONS

This is a division of application Ser. No. 290,377, filed Sept. 19, 1972, which is in turn a divisional application of Ser. No. 62,579, filed Aug. 10, 1970, now abandoned.

The present invention relates to the removal of cobalt from nickel II salt solutions, and in particular from solutions containing nickel II sulphates and/or chlorides and/or nitrates.

There have been known for a long time methods for the removal of cobalt by oxidation from solutions of this type, in which the cobalt initially present in solutions in the divalent state is oxidized to the trivalent state, in which it hydrolyzes to form cobalt hydroxide.

There is most frequently used as an oxidizing agent, either gaseous chlorine, or nickel III hydroxide or nickelic hydroxide.

The use of gaseous chlorine presents a certain number of difficulties, amongst which may be mentioned the complexity of equipment for its industrial use, the uncertainty of the yield, the difficulties involved in handling gaseous chlorine and finally, above all, the appearance, in the treated solutions, of undesirable chlorine anions.

On the other hand, nickelic hydroxide has the great advantage of not contaminating the treated solution with undesirable anions. However, a great disadvantage is that nickelic hydroxide, as well as the resultant cobaltic hydroxide is naturally very colloidal. Thus, separation of these compounds from the treated solution by filtration or by flocculation and decantation is difficult.

According to the present invention, there is provided a method for the removal of cobalt from a nickel II salt solution of the type in which the cobalt is oxidized from the divalent state to the trivalent state in order to precipitate it in the form of a cobalt compound, characterised in that the oxidizing agent is a nickel III compound containing carbonate ions.

According to another aspect of the present invention, there is provided a nickel III compound containing carbonate ions and a method of preparing such a compound by reacting with agitation a solution of a nickel II salt with an aqueous solution containing at one and the same time an alkaline carbonate and an alkaline oxidizing salt, separating the precipitate obtained from the mother liquor and washing the precipitate to recover a mixture of basic nickel II carbonate and basic nickel III carbonate.

The subsequent general description and the present examples which are in no way limiting which accompany this description will make it easier to understand how the invention may be realised.

There will firstly be described the method of preparation of the new nickel compound, then its use as an agent for the removal of cobalt.

In order to prepare the new nickel III compound a solution of a nickel salt (sulphate and/or chloride and/or nitrate) is introduced into an aqueous solution containing both an alkaline carbonate and an alkaline oxidizing salt.

Preferably, the carbonate is sodium carbonate and the alkaline oxidizing salt is a persulphate a hypochlorite or a hypobromite of an alkaline metal, most advantageously concentrated sodium hypochlorite.

The quantity of sodium carbonate used is calculated in relation to the nickel used in the form of a practically neutral solution (pH4 to 6), so as to form nickel III carbonate having the formula $Ni_2(CO_3)_3$. The optimum amount of sodium carbonate is 1.2 to 1.4 times the theoretical amount.

The amount of alkaline oxidizing salt to be used is preferably between 1.10 and 1.25 times the amount theoretically necessary for transforming nickel II into nickel III by oxidation; in the case of sodium hypochlorite, for example, the theoretical calculation is based on the fact that one $ClO^-$ ion is able to oxidize two $Ni^{2+}$ ions.

In the case of sodium carbonate and of sodium hypochlorite, the reaction temperature should be kept below 25°C and preferably between 10° and 15°C.

Stirring should be effective and kept up for approximately 30 minutes after the introduction of the divalent nickel salt solution. The suspension is then filtered and the precipitate washed either on the filter, or by cold water and new filtration, until most of the $Na^+$, $Cl^-$ and possibly $SO_4^{--}$ and $NO_3^-$ have been removed.

The oxidation yield from nickel II to nickel III is calculated after the analysis of the precipitate measurement of the total nickel and determination of the oxidizing power (expressed in trivalent nickel) by iodometry; this yield being calculated in the following manner:

$$\% \text{ Yield} = \frac{\% \text{ Nickel III}}{\% \text{ Nickel total}} \times 100$$

According to the method previously described, there are obtained precipitates corresponding to an oxidation yield of 70 to 90 percent. An oxidation yield nearer to 100 percent could be achieved by operating at a higher pH than that obtained with sodium carbonate for example, by adding concentrated caustic soda to the reaction mixture; but in this case, the ability of the precipitate to be filtered is substantially impaired.

The new composition according to the invention is in the form of a mixture of basic nickel II carbonate with the formula $NiCO_3, x\ Ni(OH)_2$, $x$ being between 0.5 and 2, and basic of nickel III carbonate with the formula $$Ni_2(CO_3)_3\ y\ Ni_2O_3,\ z\ H_2O$$

in which $y$ is between 3 and 10 and $z$ between 4 and 10.

The precipitate does not contain solely basic nickel III carbonate. In addition, the $CO_2$ content of the precipitates obtained is generally sufficient for the nickel to form non-basic carbonates.

In the following description, the new product obtained will be called "Nickel III carbonate."

There will now be described the method of removing cobalt according to the invention.

The removal of cobalt takes place according to the standard method consisting in oxidizing cobalt II into cobalt III, the oxidizing agent being nickel III carbonate.

The treated solutions may contain sulphates, nitrates, chlorides or mixtures of these salts.

The nickel III carbonate precipitate is repulped into the solution to be purified in a quantity calculated in relation to the cobalt contained in this solution and to the nickel III content of the precipitate. Theoretically, nickel III is necessary for oxidizing cobalt II and precipitating it in the form of basic cobalt III carbonate.

It has been stated that it requires 1.5 to 3 times the theoretic quantity of nickel III to obtain a very good level of removal cobalt, less than 0.010 g.Co/l for an initial content of 0.5 to 12 g/l (there is no limit for the initial cobalt content).

The removal of cobalt takes place at a high temperature of 60°C up to boiling point and preferably from 80° to 95°C. The reaction takes place with stirring during a period which depends on the temperature, for example 1 hour at 95°C or 2 hours at 65°C. After the reaction, the suspension is filtered and the precipitate washed on the filter, or by repulping in warm water.

The precipitate obtained contains, besides the cobalt III, nickel III introduced in excess and which can be reutilized for a new treatment for the removal of cobalt in addition to fresh nickel III carbonate; this operation has the advantage of lowering the Ni/Co ratio in the final precipitate.

The invention will be further described in the following examples.

EXAMPLE 1

The following mixture is prepared:

250 ml. solution of sodium hypochlorite (38g ClO⁻(1)
71g. commercial sodium carbonate 97%. i.e. 69g. $Na_2CO_3$ Into this mixture kept at 18°C, there is poured in 25 minutes, with stirring 200 ml. of a nickel sulphate solution having a concentration of 100g.Ni/l. After the reaction, the suspension is filtered and the precipitate washed with three re-pulpings in cold water.

There is thus obtained 105 g of titrating:

Total Ni = 18.9%
$Ni^{3+}$ = 14.1% (oxidation yield:75%)
$CO_3^{2-}$ = 4.5%

This cake is used for removing the cobalt from a chlorine solution containing:
Ni = 34.3 g/l
Co = 12.2 g/l.

A comparative experiment is carried out with nickel III hydroxide prepared by precipitation.

The nickel III compounds are re-pulped in the solution to be purified at the rate of 1.6 times the theoretical quantity of nickel III necessary for oxidizing the cobalt present; the temperature is kept for 1 hour at 85°C<$t$<95°C. The suspensions are vacuum filtered in a buchner (filtering surface: 78cm²) and the periods of filtration are recorded.

| Oxidizing Agent (Nickel III) | hydroxide | carbonate |
|---|---|---|
| Volume of filtrate (in ml) | 450 | 490 |
| Length of filtration | 1hr.30mins | 4 mins. |
| Filtrate Ni (g/l) | 32.9 | 33.3 |
| Co (g/l) | 0.009 | 0.011 |

EXAMPLE 2

The following mixture is prepared:

440 ml. extract of JAVEL (98 g ClO⁻/l).
135 g. commercial sodium carbonate (97%, i.e. 131g of $Na_2CO_3$ dissolved in 1.750 ml. water.)

Into this mixture, kept at 14°C, there is poured, in 30 minutes, 675 ml. of a solution of nickel chloride at a concentration of 132g. Ni/l. After the reaction and washing of the precipitate, a cake is obtained which titrates:

Total Ni = 17.6%
$Ni^{3+}$ = 15.2% (oxidation yield=86%)
$Na^+$ = 0.23%
$CO_3^{2-}$ = 1.64%

This cake is used for removing the cobalt from a chloride solution containing:
Ni = 48.3g/l
Co = 11.2g/l
and with a pH=5.7

For this, it is repulped in the solution to be treated in an amount of twice the theoretical amount of nickel III necessary for oxidizing the cobalt present. The temperature is kept for 1 hour 30 mins. at approximately 95°C. The suspension is filtered in a buchner with a surface area of 1.5dm². The length of filtration is 6 minutes for 1,000 ml of filtrate recovered titrates:
Ni = 51.0 g/l
Co = 0.007 g/l The precipitate after washing contains:

Total (Ni + Co)     = 25.2%
(Ni + Co)³⁺         = 18.5%
$Co^{3+}$           = 10.9%
$Ni^{3+}$           = 7.6%
$CO_3^{2-}$         = 1.5%
$Na^+$              = 0.007%
$Cl^-$              = 0.011%

This product still contains enough nickel III to be used for another operation for removing cobalt.

EXAMPLE 3

The same mixture is prepared and the same conditions as in Example 2 are employed, except that 750 ml of a solution of nickel nitrate at a concentration of 118g Ni/l are employed.

The obtained cake titrates:

Total Ni       = 22.0%
$Ni^{3+}$      = 18.4% (oxidation yield:84%)
$Na^+$         = 0.15%
$Cl^-$         = 0.02%
$CO_3^{2-}$    = 2.7%
$NO_3^-$       = 0.10%

The cake is repulped in a solution of nickel sulphate, from which the cobalt has to be removed, the operating conditions being the same as those described in Example 2.

The sulphate solution titrates:
Ni = 20.1 g/l
Co = 5.5 g/l and has a pH of 5.8.

The length of filtration, after the reaction is 3 minutes for 1000 ml of filtrate recovered titrating:
Ni = 79.5 g/l
Co = 0.011 g/l

EXAMPLE 4

The cake of nickel III carbonate obtained in Example 3 is used for removing the cobalt from a solution of chlorides containing:
Ni = 48.3 g/l Co = 11.2 g/l and with a pH of 5.7.

The method of operation is that described in Example 2. The length of filtration is 5 min. 30 sec. for 1,000 ml of filtrate recovered titrating:

Ni = 51.8 g/l
Co = 0.002 g/l

The precipitate obtained, after washing, contains:

| | |
|---|---|
| Total (Ni + Co) | = 23.7% |
| (Ni + Co)$^{3+}$ | = 17.0% |
| Co$^{3+}$ | = 7.5% |
| Ni$^{3+}$ | = 9.5% |
| CO$_3^{2-}$ | = 0.82% |
| Cl$^-$ | = 0.17% |
| NO$^-$ | = 0.10% |
| Na$^+$ | = 0.005% |

EXAMPLE 5

The following mixture is prepared:

6.7 l. extract of Javel at 123 gClO$^-$/l
5.75 kg commercial sodium carbonate at 97% Na$_2$CO$_3$ dissolved in 25.2 l. of water.

Into this mixture at 20°C there is quickly poured 13.1 l. of a solution of nickel sulphate at a concentration of 114 g. Ni/l. The temperature falls to 18°C and is constant for 30 minutes stirring.

The suspension is filtered on a filter-press with frames equipped with sheets of TERYLENE 486, the rise in pressure taking place by means of a montejus up to 2kg/cm². For this first filtration, the average flow is about 40 l/h/m² and at the end of the process the frames are well filled.

The cake is washed with three repulpings in cold water followed by filtration at an average flow of 80 l/h/m². There is obtained a cake of nickel III carbonate which titrates:

| | |
|---|---|
| Total Ni | = 11.6% |
| Ni$^{3+}$ | = 9.8% (Oxidation yield = 84.5%) |
| CO$_3^-$ | = 6.9% |
| Na$^+$ | = 0.10% |

EXAMPLE 6

2.1 kg. of a precipitate of nickel III carbonate containing 8.27% nickel III are repulped in a solution of nickel sulphate and nitrate titrating:

Ni=100 g/l
Co=1.68 g/l and with a pH of 4.3.

The mixture is kept at 65°C for 2 hours with stirring. After the reaction, the suspension is filtered on the same filter-press as that described in Example 5. The filtration flow is about 250 l/h/m². The filtrate which leaves is immediately clear and no clogging up of the sheets appears. The washing takes place, on the filter, in warm water (about 60°C), the speed of filtration being of the order of 400 l/h/m².

The purified solution, diluted by the first washing water titrates:

Ni=80.2 g/l
Co=0.005 g/l

The cake obtained (2.5kg) contains:
Total Ni=16.6%
Total Co=3.30%
(Ni+Co)$^{3+}$=8.30%

EXAMPLE 7

2.93 kg. of a precipitate of nickel III carbonate (15.48% nickel III) are repulped in 28 liters of a solution of chlorides titrating:

Ni=40.6 g/l
Co=10.8 g/l

The suspension is kept at 80°/90°C with stirring for 1 hour 30 minutes. It is then filtered on the filter-press with frames mentioned in the preceding examples, mounted to have a filtering surface of 0.12m². The filtration is very fast: 28.5 l of immediately clear filtrate in 12 minutes and titrating:

Ni=40.2 g/l
Cc=0.006 g/l

The precipitate, after washing on the filter with 50 litres warm water, then drying with compressed air, contains:

| | |
|---|---|
| Total Ni | = 14.96% |
| Ni$^{3+}$ | = 7.1% |
| Co | = 14.24% |
| Dry materials | = 50% |

The oxidizing power of Ni$^{3+}$ introduced in excess during this operation is used during a second treatment which consists of a partial removal of cobalt:

1.6 kg of this precipitate and 0.5 kg of a precipitate of fresh nickel III carbonate (15.48% nickel III) are repulped in 34 liters of a solution of chlorides titrating:

Ni=50.4 g/l
CO=10.7 g/l.

The process is carried out as previously. The length of filtration is 15 minutes for 34 liters of filtrate titrating:

Ni=44.9 g/l
Co=5.12 g/l and the washed and dried precipitate contains:
dry materials 50% giving a ratio Ni/Co = 0.52 against 1.05 of the first stage.

The solution with the cobalt partially removed can be removed by a nickel III carbonate newly introduced in excess etc.

There can thus be operated a step wise treatment which has the advantage of lowering the consumption of oxidizing agent and equally of diminishing the amount of nickel in the remainder of the cobalt removing operation.

The only figure of the accompanying drawing illustrates schematically such a step wise treatment.

The nickel III carbonate can, in addition to the cobalt, eliminate the relatively major proportions of of iron and the last traces of lead or arsenic possibly contained in the treated solutions.

What is claimed is:

1. A process for removing cobalt from a saline solution of nickel II contaminated by cobalt II of the type in which the cobalt is oxidized from the divalent state to the trivalent state in order to make it precipitate in the form of a cobalt III compound, characterized by the step of adding to said saline solution an oxidizing agent comprising a basic nickel III carbonate of the general formula Ni$_2$(CO$_3$)$_3$, $y$ Ni$_2$O$_3$, $z$ H$_2$O, wherein $y$ is between 3 and 10 and $z$ is between 4 and 10, the cobalt precipitating in the form of a carbonate.

2. The process of claim 1 wherein said oxidizing agent is introduced into the saline solution in a quantity sufficient to provide an amount of said basic nickel III carbonate of the order of 1.5 to 2 times the theoretical quantity necessary to convert the total cobalt II present to cobalt III, and in which the temperature of the reaction is maintained between 60° and 95°C.

3. The process of claim 1 wherein the precipitate finally obtained is filtered and recovered to be recycled to utilize the excess nickel III carbonate present therein for further cobalt removal.

4. A process for removing cobalt from a saline solution of nickel II contaminated by cobalt II in which the cobalt is oxidized from the divalent state to the trivalent state in order to make it precipitate in the form of a cobalt III compound, characterized by the step of adding to said saline solution an oxidizing composition comprising a minor portion of basic nickel II carbonate having the formula $NiCO_3 \cdot x\ Ni(OH)_2$, $x$ being between 0.5 and 2, and a major portion of basic nickel III carbonate having the formula $Ni_2(CO_3)_3 \cdot y\ Ni_2O_3 \cdot z\ H_2O$, wherein y is between 3 and 10 and z is between 4 and 10, the cobalt precipitating in the form of a carbonate.

5. The process of claim 4 wherein said oxidizing composition is introduced into the saline solution in a quantity sufficient to provide an amount of said basic nickel III carbonate of the order of 1.5 to 2 times the theoretical quantity necessary to convert the total cobalt II present to cobalt III, and in which the temperature of the reaction is maintained between 60° and 95°c.

6. The process of claim 5 wherein the precipitate finally obtained is filtered and recovered to be recycled to utilize the excess oxidizing composition present therein for further cobalt removal.

* * * * *